United States Patent
Watanabe et al.

(10) Patent No.: US 9,806,457 B2
(45) Date of Patent: Oct. 31, 2017

(54) ARTICULATED ROBOT WITH CONNECTION MEMBER FOR CONNECTING WIRE BODY ARRANGED ON ARM

(71) Applicant: FANUC CORPORATION, Yamanashi (JP)

(72) Inventors: Hideyuki Watanabe, Yamanashi (JP); Satoshi Kinoshita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/075,864

(22) Filed: Mar. 21, 2016

(65) Prior Publication Data
US 2016/0297081 A1    Oct. 13, 2016

(30) Foreign Application Priority Data
Apr. 9, 2015   (JP) ................ 2015-080330

(51) Int. Cl.
*H01R 13/60* (2006.01)
*B25J 11/00* (2006.01)
*B25J 19/00* (2006.01)

(52) U.S. Cl.
CPC .......... *H01R 13/60* (2013.01); *B25J 11/0045* (2013.01); *B25J 19/0025* (2013.01); *Y10S 901/15* (2013.01)

(58) Field of Classification Search
CPC ..... B25J 19/0029; H01R 13/60; Y10S 901/15
USPC ....................................................... 74/490.02
See application file for complete search history.

(56) References Cited

U.S. PATENT DOCUMENTS

| 4,664,588 A | * | 5/1987 | Newell | B23Q 1/0063 294/86.4 |
| 5,732,599 A | * | 3/1998 | Iriyama | B25J 17/0241 74/490.02 |
| 6,279,413 B1 | * | 8/2001 | Terada | B25J 19/0029 414/917 |
| 6,530,806 B2 | * | 3/2003 | Nelson | H01R 13/71 200/51.09 |
| 6,875,937 B1 | * | 4/2005 | Saviano | H02G 3/123 200/267 |
| 8,490,510 B2 | * | 7/2013 | Long | B25J 19/0054 74/490.01 |
| 9,266,244 B2 | * | 2/2016 | Larsson | B25J 19/0025 |
| 2003/0089710 A1 | * | 5/2003 | Gates, II | H01R 25/006 220/3.92 |
| 2004/0261563 A1 | * | 12/2004 | Inoue | B25J 19/0025 74/490.03 |
| 2007/0269317 A1 | * | 11/2007 | Clancy | F04B 39/123 417/54 |

(Continued)

FOREIGN PATENT DOCUMENTS

| CN | 102896638 A | 1/2013 |
| JP | 4-294996 A | 10/1992 |

(Continued)

*Primary Examiner* — Victor MacArthur
(74) *Attorney, Agent, or Firm* — Hauptman Ham, LLP (57) ABSTRACT

An articulated robot comprises an arm which changes a direction at a joint, and a tube coupling to which a wire body is connected and which is attached to the arm. The arm includes a frame which has a hollow interior. The frame has a concave part which is depressed toward the interior. The tube coupling is arranged inside the concave part.

7 Claims, 9 Drawing Sheets

(56) References Cited

U.S. PATENT DOCUMENTS

| | | | |
|---|---|---|---|
| 2008/0156137 A1* | 7/2008 | Larsson | B25J 19/0025 74/490.02 |
| 2011/0154933 A1* | 6/2011 | Liu | B25J 19/0029 74/490.02 |
| 2011/0203823 A1* | 8/2011 | Beaudry | B23Q 1/012 173/46 |
| 2012/0171759 A1* | 7/2012 | Williams | B01L 3/5027 435/287.2 |
| 2013/0168505 A1 | 7/2013 | Ljungkvist | |

FOREIGN PATENT DOCUMENTS

| | | |
|---|---|---|
| JP | 2002-283275 A | 10/2002 |
| JP | 2005-14159 A | 1/2005 |
| JP | 2007-44767 A | 2/2007 |
| JP | 2007-229906 A | 9/2007 |
| JP | 2011-255496 A | 12/2011 |
| JP | 2012-20368 | 2/2012 |
| JP | 2013-212560 A | 10/2013 |

\* cited by examiner

FIG. 17

ARTICULATED ROBOT WITH CONNECTION MEMBER FOR CONNECTING WIRE BODY ARRANGED ON ARM

RELATED APPLICATIONS

The present application claims priority to Japanese Patent Application Number 2015-080330, filed Apr. 9, 2015, the disclosure of which is hereby incorporated by reference herein in its entirety.

BACKGROUND OF THE INVENTION

1. Field of the Invention

The present invention relates to an articulated robot equipped with an arm.

2. Description of the Related Art

An articulated robot changes its position and posture by changing the angle at a joint arranged between the arms thereof. A wrist is arranged at the tip of the arm and a work tool such as a hand is attached to the wrist. A lot of work tools are provided with a driving mechanism which necessitates the supply of electric power or air etc. Further, there are cases where electric signals are transmitted to the work tool in order to drive the same. The electric power, air and electric signals etc., are provided to the work tool by electric wiring or piping referred to as wire bodies.

The wire bodies connected to the work tool are connected to the robot to supply electric power etc. The robot is equipped with a connection member at which the wire body is connected. A connector and a tube coupling correspond to the connection member. It is preferable for such the connection member to be positioned near the work tool so as to facilitate the connection of the wire bodies. Accordingly, the connection member is generally equipped on the surface of the arm of the robot near the work tool.

Japanese Unexamined Patent Publication No. 2013-212560 discloses a robot comprising a connection part which includes connecting main body, a hollow connector housing, and a support member which supports terminals. It is disclosed that the connection part protrudes from the surface of the arm, and the pull-out direction of the connector which is connected to the connection part are set to be a predetermined direction of a rotation axis.

The articulated robot is often arranged in an environment which is crowded with other robots or peripheral devices. Accordingly, it is desirable that the area of interference when the robot moves be small. However, the connection member such as the connectors or tube couplings protrudes from the surface of the arm. Accordingly, there is a problem that the connection member may easily interfere with surrounding devices such as other robots, or portions of the robot other than the connection member.

Further, for articulated robots used in factories for producing food, pharmaceuticals, and etc., it is necessary to maintain a high level of cleanliness in view of hygiene. A worker can maintain the cleanliness by cleaning the robot with a chemical solution or water. However, the connection member of the prior art protrudes from the surface of the arm, resulting in the problem that it is easy for foreign substances such as dirt or cleaning liquid to accumulate around the connection member. Thus, the level of cleanliness may deteriorate or more effort may be required for cleaning.

In particular, robots which is used in an environment where liquid such as cleaning liquid is splashed have a configuration to seal the inside of the arm to prevent the entry of liquid therein. A packing is arranged between the surface of the arm and the connection member. However, the packing is gradually eroded by foreign substances which accumulate at the bottom of the connection member. As a result, there is a problem that it is easier for foreign substances to enter the inside of the arm from sealed portions between the connection member and the arm than sealed portions other than the connection member.

SUMMARY OF INVENTION

The articulated robot of the present invention comprises an arm which changes a direction at a joint, and a connection member to which a wire body is connected, and which is attached to the arm. The arm includes a frame having a hollow interior. The frame has a recessed part depressed toward the interior. The connection member is arranged inside the recessed part.

In the above invention, the frame can include a tubular part which has a tubular shape, a wall part extending toward the interior of the frame from the tubular part, and a bottom plate part extending along the surface of the arm from the wall part, the recessed part can be formed of the wall part and the bottom plate part. The bottom plate part can be constituted by a plate member, the plate member can be secured to the wall part via a first sealing member, and the connection member can be secured to the plate member via a second sealing member.

In the above invention, the arm can include a cover member which covers the entire recessed part, the cover member can have a hole through which the wire body extends externally.

In the above invention, the arm can include a dust-proofing member which seals a gap between the hole and the wire body, and the cover member can have an opening part to discharge liquid which is flowed into the interior of the recessed part.

In the above invention, the arm can include a third sealing member which seals a gap between the hole and the wire body and a fourth sealing member which seals a gap between the cover member and the frame, and the space surrounded by the recessed part and the cover member can be sealed.

In the above invention, the arm can include a support base for supporting the wire body and a fixing member for securing the wire body to the support base, the support base is secured to the frame in a region in the vicinity of the hole, and the wire body can be secured to the support base by the fixing member.

In the above invention, the arm is formed so that a lid member which covers the entire recessed part can be attached when the wire body is not connected to the connection member.

DETAILED DESCRIPTION

Referring to FIGS. 1 to 17, a robot in the embodiment will be explained. The robot according to the present embodiment has joints between the arms, and the direction of the arms change at the joints. Further, the robot of the present embodiment is a multi-articulated robot which comprises a plurality of joints. The robot also includes arm driving devices for driving the arms at respective joints.

Figure 1:
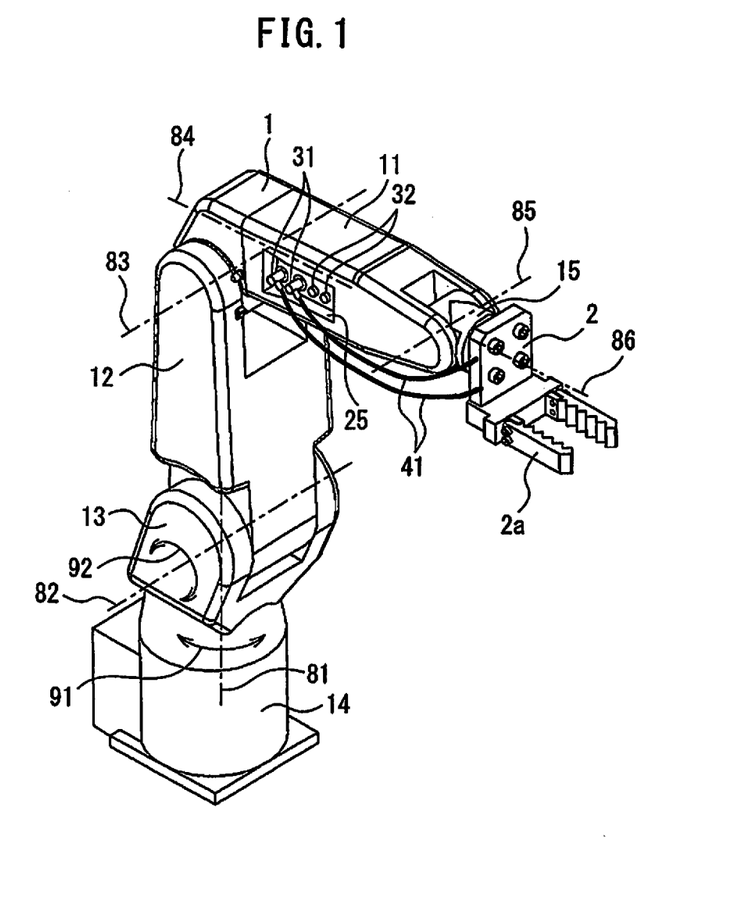
FIG. 1 is a perspective view of the first robot according to an embodiment.

FIG. 1 is a perspective view of a robot system according to the present embodiment. The robot system comprises a hand 2 which grips a workpiece and a first robot 1 which moves the hand 2. The hand 2 is a work tool which grips and releases a workpiece. A work tool can also be referred to as an end effector. Work tools are not limited to hands, and any work tool such as work tools for welding or work tools for painting can be employed.

The robot 1 comprises a base 14 which is secured on the installation surface and a turning portion 13 supported by the base 14. The turning portion 13 is formed to be rotatable with respect to the base 14 with a turning axis 81 serving as the rotation axis as illustrated by arrow 91. The robot 1 comprises a plurality of arms 11, 12. The arm 12 is supported by the turning portion 13. The arm 12 is formed to be rotatable with respect to the turning portion 13 with a turning axis 82 as the rotation axis as illustrated by arrow 92. The arm 11 is supported by the arm 12. The arm 11 is formed to be rotatable with respect to the arm 12 with a turning axis 83 as the rotation axis.

The robot 1 includes a wrist 15 which is arranged at the end of the arm 11. The hand 2 is secured to a wrist 15. The robot 1 comprises a wrist driving device to drive the wrist 15. The wrist 15 is formed to be rotatable around a turning axis 85 as the rotation axis. Furthermore, the wrist 15 rotatably supports the hand 2 with a turning axis 86 as a rotation axis.

The robot 1 comprises a hand driving device for driving the hand 2. In the present embodiment, the hand driving device drives the opening and closing of claws 2a. The hand driving device of the present embodiment drives the hand 2 by compressed air. The hand driving device of the present embodiment includes a hand driving cylinder arranged on the hand 2. Further, the hand driving device includes an air pump for supplying compressed air to the hand driving cylinder. The air pump is arranged in the robot 1. Compressed air is supplied to the hand 2 from the robot 1 through wire body 41.

Herein, the term "wire body" is a generic term covering electric wiring and piping etc. The wire bodies include electric wiring such as power lines for supplying electric power to motors and signal lines for supplying electric signals. Furthermore, the wire bodies include pipes which supply liquid or gas.

Figure 2:
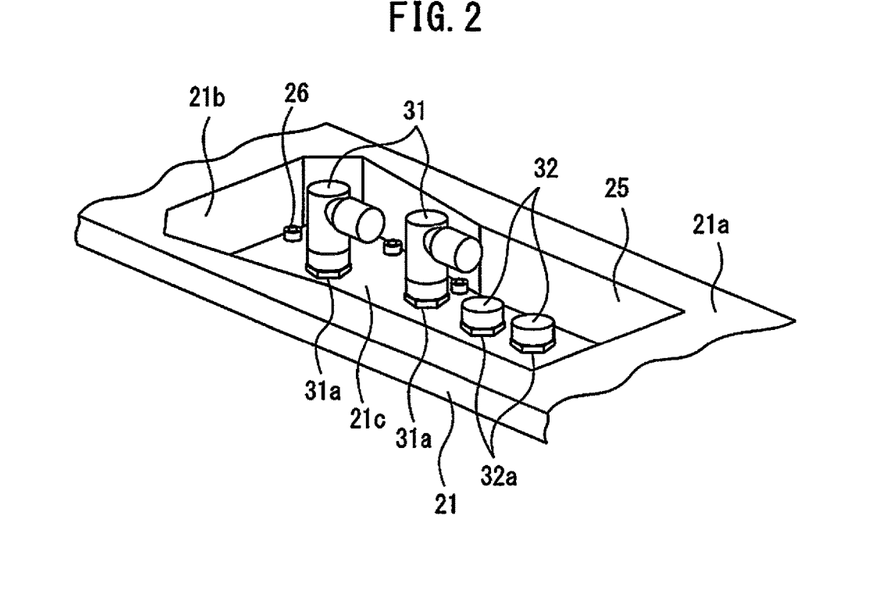
FIG. 2 is an enlarged perspective view of a portion at which the connection members are arranged in the first robot.
Figure 3:
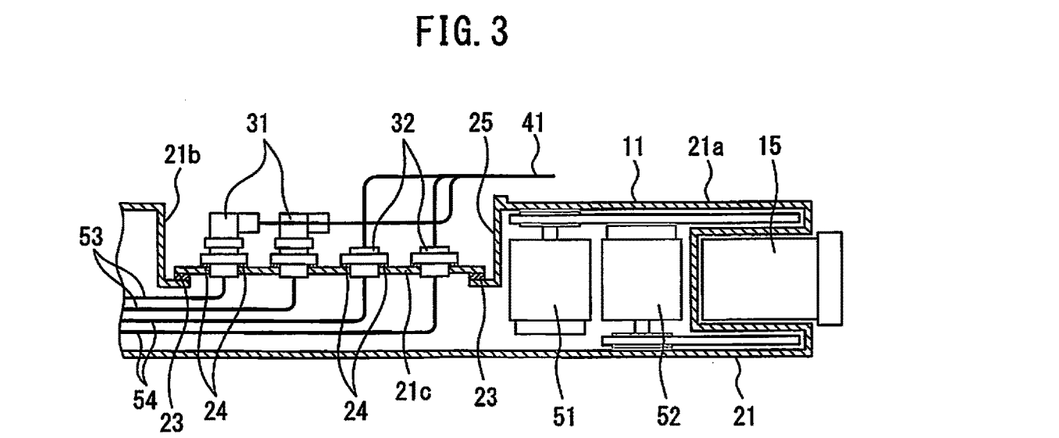
FIG. 3 is a schematic sectional view of a portion at which the connection members are arranged in the first robot.

FIG. 2 is an enlarged perspective view of the portion at which the connection members are arranged in the first robot. FIG. 3 is a schematic sectional view of a part at which the connection members and the wrist driving device arranged in the first robot. With reference to FIGS. 1, 2 and 3, the arm 11 includes a frame 21 which has a hollow interior. Devices which are driven by electricity such as wrist driving motors 51, 52 which drive the wrist 15 are arranged in the interior of the frame 21.

The frame 21 includes a tubular part 21a which is formed to be a tubular shape. A recessed part 25 depressed toward the interior is formed in a side surface of the frame 21. The recessed part 25 is formed to be depressed from the surface of the arm 11. The frame 21 includes a wall part 21b which extends from the tubular part 21a towards the interior of the frame 21. The frame 21 includes a plate member 21c serving as a bottom plate part secured to the wall part 21b. The bottom plate part extends along the surface of the arm 11 from the wall part 21b. The recessed part 25 is formed of the wall part 21b and the plate member 21c.

Tube couplings 31 and connectors 32 which function as connection members are secured to the plate member 21c. The connection member is a member for connecting electric wires or pipes. The connection members may be a connector for connecting a power line for supplying electric power to motors, or a connector for connecting an electric wire such as a signal line for supplying electric signals, or tube couplings for supplying liquid or gas by way of example.

The plate member 21c is secured to the bottom part of the wall part 21b by bolts 26 serving as fastening members. The tube couplings 31 and the connectors 32 are inserted into insertion holes formed in plate member 21c. In the insertion hole, a female screw is formed. The tube couplings 31 and the connectors 32 are secured to the plate member 21c by screwing nut parts 31a and 32a.

Pipes 53 and electric wires 54 are laid in the interior of the frame 21. Each of the pipes 53 and electric wires 54 are connected to the respective connection parts of the connection members inside the frame 21. Further, the wire bodies 41 connected to the connection parts of the connection members on the outside of the frame 21 are connected to the hand 2. In this way, the wire bodies 41 can supply the work tool with air, electric power and electric signals, etc. to drive the work tool.

A packing 23 is arranged as a first sealing member between the wall part 21b and the plate member 21c. The packing 23 has a shape which is formed along the outline of the plate member 21c. Packings 24 are arranged as a second sealing member between the plate member 21c and the tube coupling 31 and between the plate member 21c and the connector 32. The packings 23 and 24 are formed of material such as rubber which has elasticity.

In this way, the plate member 21c is secured to the wall part 21b via the packing 23, and the tube couplings 31 and the connectors 32 are secured to the plate member 21c via the packing 24. By adopting this configuration, the interior of the frame 21 can be sealed even though the recessed part 25 is formed in the frame 21. The intrusion of foreign substances such as dirt or washing liquid into the interior of the frame 21 can be suppressed. With reference to FIG. 3, devices such as wrist drive motors 51, 52 are arranged in the interior of the frame 21. Alternatively, electric wires are laid in the interior of the frame 21. Therefore, there is a risk that these electric components will break down if foreign substances such as liquid or dirt intrude into the interior of the frame 21. In the present embodiment, since the interior of the frame 21 is sealed, the break-down of electrical components arranged in the interior of the frame 21 can be suppressed.

Figure 4:
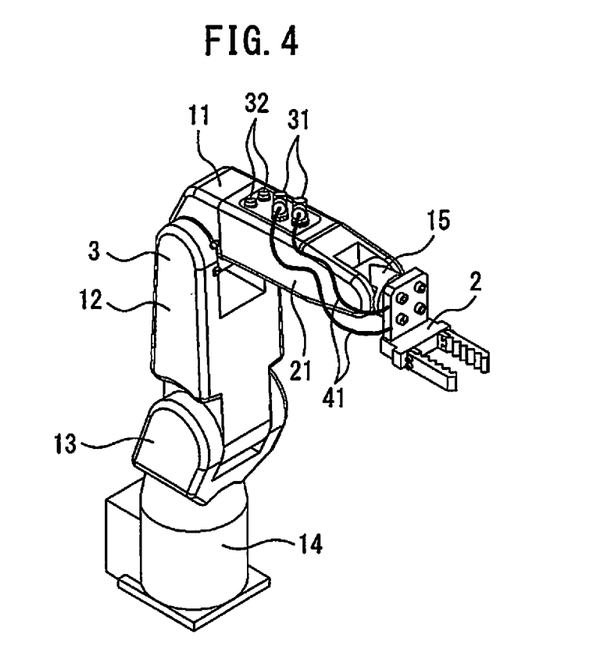
FIG. 4 is a perspective view of a comparative example of the robot.

FIG. 4 is a perspective view of a comparative example of the robot. The robot system of the comparative example comprises a robot 3. In robot 3, the tube couplings 31 and the connectors 32 serving as the connection members are arranged so as to protrude from the surface of the arm 11. In the example illustrated in FIG. 4, the top surface of the frame 21 of the arm 11 is formed to be flat. The tube couplings 31 and the connectors 32 are secured on the top surface of the arm 11.

In the robot 3 of the comparative example, the tube couplings 31 and the connectors 32 result in convex parts protruding from the surface of the arm 11 being formed. For this reason, during the operation of the robot 3, there is a risk of the tube couplings 31 and the connectors 32 interfering with parts of the robot 3 other than the connection members or other device. Since the interference region is large, the operation of the robot becomes severely restricted.

With reference to FIGS. 1 to 3, in the robot 1 of the present embodiment, the tube couplings 31 and the connectors 32 are arranged in the recessed part 25 formed in the frame 21. The protrusion of the tube couplings 31 and the connectors 32 from the surface of the arm 11 is suppressed. Accordingly, the interference region of the robot 1 of the present embodiment can be reduced. Namely, the interference of the connection members with parts of the robot 1 other than the connection members, or other device is suppressed.

In particular, the robot 1 of the present embodiment is configured so that the heights of the tube couplings 31 and the connectors 32 are less than the depth of the recessed part 25. Namely, the recessed part 25 is formed to be deep so that the tube couplings 31 and the connectors 32 do not protrude from the surface of the tubular part 21a. By adopting this configuration, the interference region can effectively be reduced.

Figure 5:
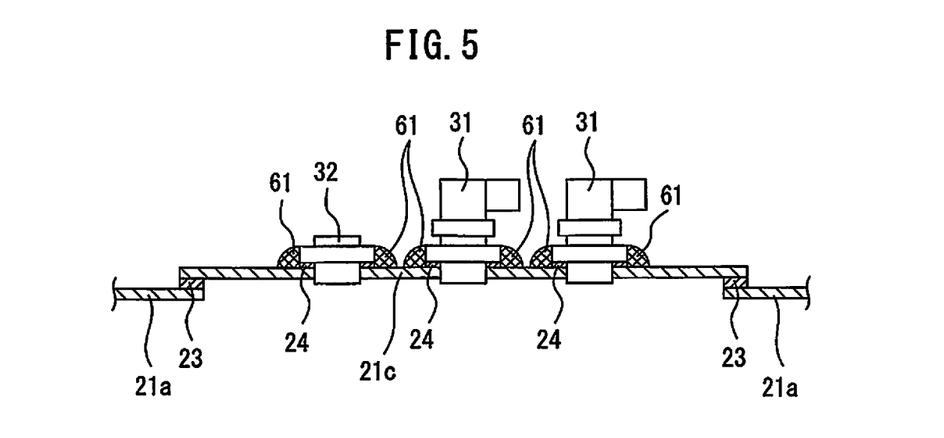
FIG. 5 is a schematic cross-sectional view of a portion at which the connection members are arranged in the comparative example of the robot.

FIG. 5 is a schematic sectional view of a portion at which the connection members are arranged in the comparative example of the robot. Since the tube couplings 31 and the connectors 32 protrude from the surface of the tubular part 21a of the arm 11 in the robot 3 of the comparative example, foreign substances 61 such as cleaning liquid tend to accumulate at the bottom portion of the tube couplings 31 and the bottom portion of the connectors 32. The foreign substances 61 accumulate so as to surround the packings 24. Since the packings 24 are in contact with the foreign substances 61, degradation by erosion etc. can easily progress. If the degradation of the packings 24 advances, the sealing of the interior of the frame 21 cannot be maintained.

With reference to FIGS. 1 to 3, the tube couplings 31 and the connectors 32 are arranged in the recessed part 25 in the robot 1 according to the present embodiment. The recessed part 25 can suppress the entry of splashed liquid therein. In particular, foreign substances 61 splashed in the direction along the surface of the frame 21 can be suppressed from intruding into the recessed part 25. Accordingly, the accumulation of foreign substances 61 can be suppressed around the tube couplings 31 and the connectors 32. As a result, a reduction in the cleanliness of the robot can be suppressed. Further, the degradation of the packings 24 can be suppressed. Furthermore, cleaning work around the connection members can be reduced.

The heights of the connection members in the present embodiment are formed to be less than the depth of the recessed part. However, not being limited thereto, a part of the connection members may protrude from the surface of the tubular part of the frame.

Figure 6:
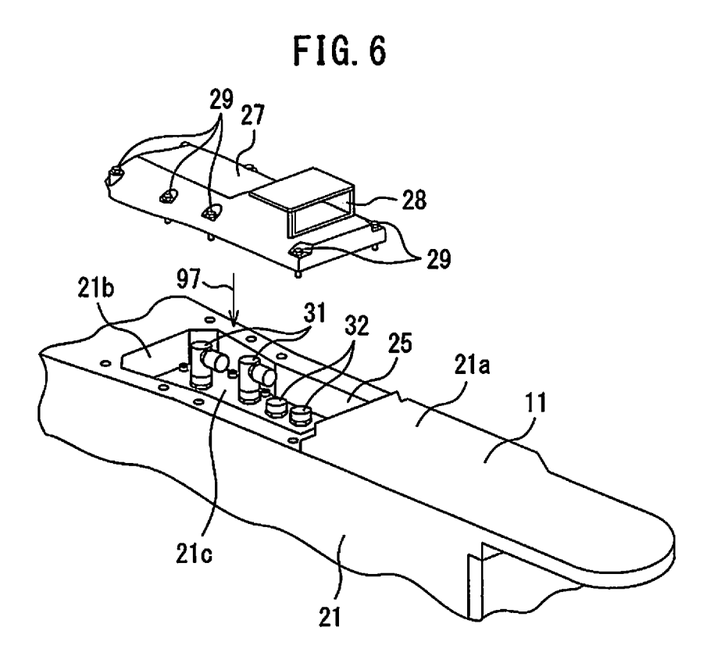
FIG. 6 is an enlarged perspective view of a portion at which the connection members are arranged in the second robot according to an embodiment.
Figure 7:
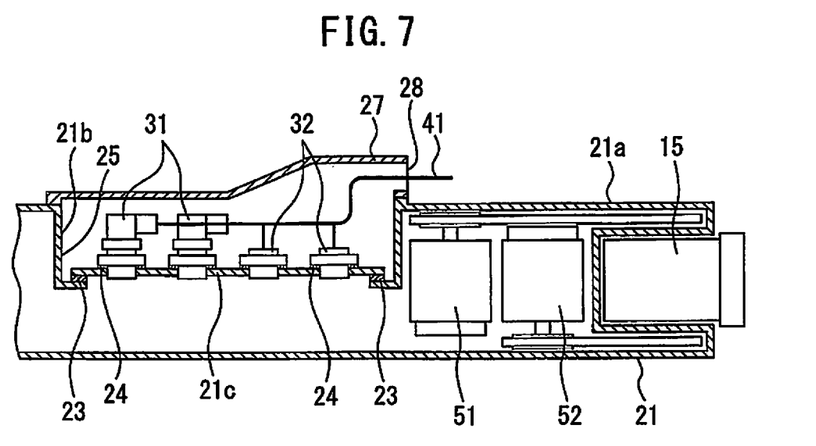
FIG. 7 is a schematic sectional view of a portion at which the connection members are arranged in the second robot.

FIG. 6 is an enlarged perspective view of a portion at which the connection members are arranged in the second robot according to an embodiment. FIG. 7 is a schematic sectional view of a portion at which the connection members are arranged in the second robot according to an embodiment. With reference to FIGS. 6 and 7, the arm 11 of the second robot includes a cover member 27 which covers a whole of recessed part 25. The cover member 27 has a hole 28 through which wire bodies 41 are pulled out. The hole 28 is formed in a portion which faces hand 2 in the cover member 27. The cover member 27 is arranged so as to cover recessed part 25 as shown by the arrow 97. The cover member 27 is secured to the tubular part 21a of the frame 21 by bolts 29 serving as fastening members. The wire bodies 41 connected to tube couplings 31 and connectors 32 are pulled out to the exterior through the hole 28.

In the second robot, since the tube couplings 31 and the connectors 32 are covered by the cover member 27, the intrusion of the foreign substances into the recessed part 25 can be suppressed. The accumulation of foreign substances around the tube couplings 31 and around the connectors 32 is less likely. Specifically, the number of fine convex parts decreases when viewed from the outside of the arm 11, so the accumulation of foreign substances is the less likely. Accordingly, the cleanliness of the robot 1 increases. Further, cleaning work on the robot 1 is reduced.

Figure 8:
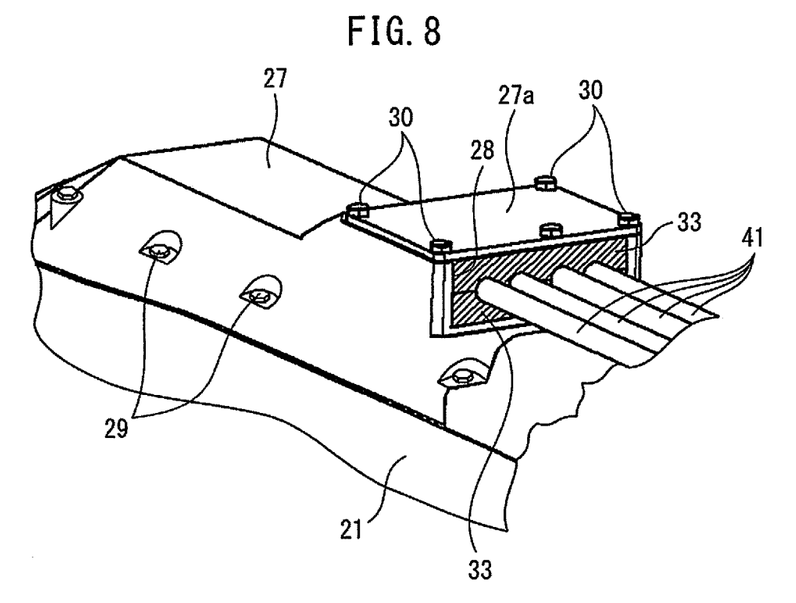
FIG. 8 is an enlarged perspective view of a cover member according to the first modified example of the second robot.
Figure 9:
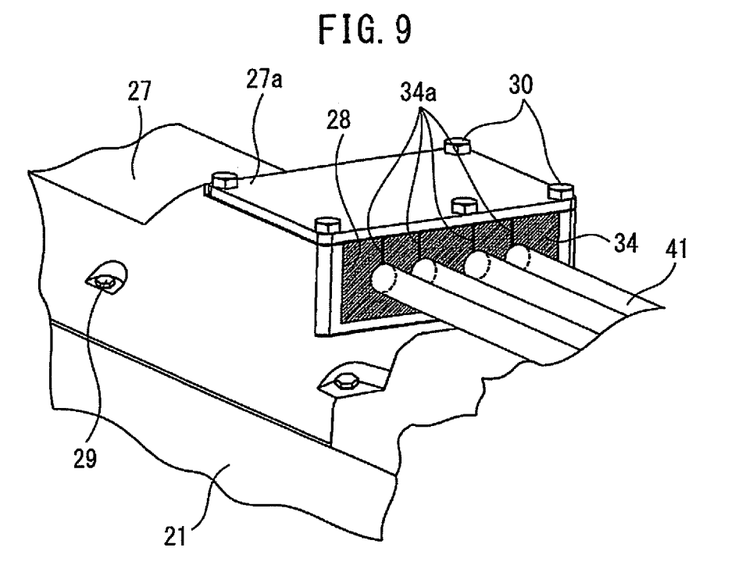
FIG. 9 is an enlarged perspective view of the cover member according to the second modified example of the second robot.

FIG. 8 shows a first modified example of the second robot in the present embodiment. FIG. 9 shows a second modified example of the second robot in the present embodiment. The robot 1 illustrated in FIGS. 8 and 9, is provided with sponge members 33 or 34 serving as dust-proofing members in the hole 28 of the cover member 27. The sponge members 33 and 34 seal the gap between the hole 28 and the wire bodies 41. The dust-proofing members can, for example, be formed from a soft and deformable material such as sponge.

In the first modified example illustrated in FIG. 8, two sponge members 33 are used. When the cover member 27 is assembled, after arranging the lower sponge member 33, the wire body 41 is arranged on the surface of the lower sponge member 33. Next, the upper sponge member 33 is arranged. Then, a top plate 27a is secured by bolts 30.

In the second modified example illustrated in FIG. 9, a plurality of notch parts 34a is formed in the sponge member 34. The notch parts 34a are formed to correspond to the position and number of the wire bodies 41. In this configuration, after arranging the sponge member 34 in the hole 28, the wire bodies 41 are inserted into the notch parts 34a. All of the wire bodies 41 are arranged in the desired positions. Thereafter, the top plate 27a is secured by the bolts 30.

In the first modified example and the second modified example of the second robot 2, the hole 28 through which wire bodies 41 are pulled out are closed by closing members, so the intrusion of foreign substances such as dust and dirt into the cover member 27 can be suppressed. Namely, foreign substances are suppressed from entering the interior of the recessed part 25. Thus the accumulation of foreign substances around the connection members can be effectively suppressed.

Note that the dust-proofing members are not limited to members formed of sponge, but can be made of any material which suppresses the intrusion of dust, dirt, etc.

Figure 10:
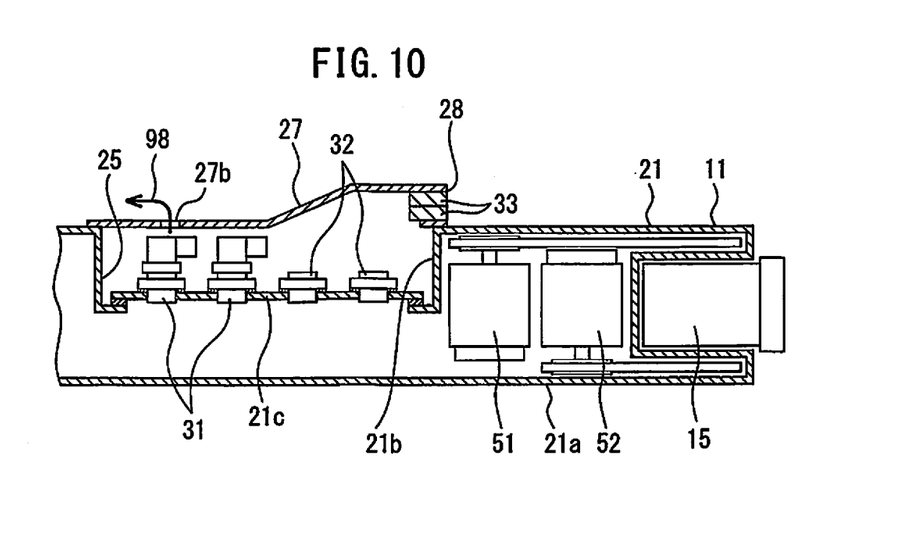
FIG. 10 is a schematic sectional view of a portion at which the connection members are arranged in the third modified example of the second robot.

FIG. 10 shows a schematic sectional view of a portion at which the connection members are arranged in the third modified example of the second robot. In the aforementioned second robot, the intrusion of solid foreign substances such as dust can be suppressed. However, liquid foreign substance such as cleaning liquid sometimes passes through the dust-proofing member. Further, liquid foreign substance sometimes intrudes into the recessed part 25 from the contact portion of the cover member 27 and the frame 21. The robot 1 according to the third modified example has an opening part 27b for discharging liquid which flows into the recessed part 25. In the third modified example, the opening part 27b is formed in the cover member 27. The opening part 27b can be configured to be a hole which penetrates cover member 27. The opening part 27b functions as a water-draining hole.

By providing the cover member 27 with opening part 27b, when the arm 11 moves and the opening part 27b faces downward, the liquid which has accumulated inside the recessed part 25 can be discharged as illustrated by arrow 98. Alternatively, a worker manually operates the robot 1 so as to move the robot 1 into a position and posture so that the opening part 27b faces downward. The liquid foreign substance may be discharged from the opening part 27b.

Figure 11:
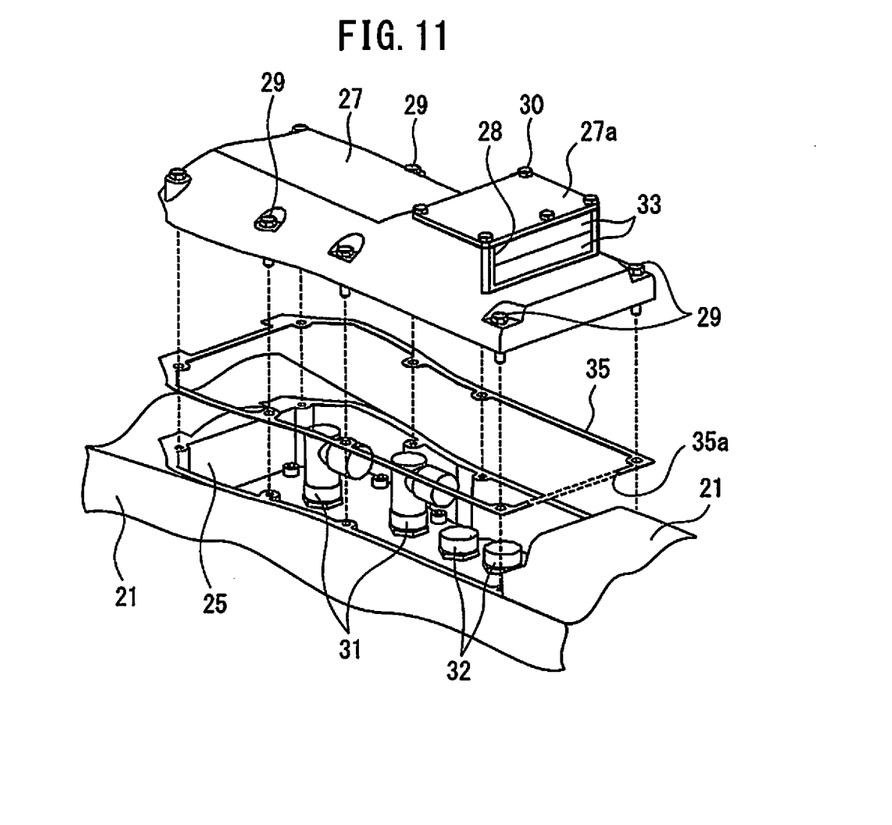
FIG. 11 is an enlarged perspective view of a portion at which the connection members are arranged in the fourth modified example of the second robot.

FIG. 11 shows a perspective view of a portion at which the connection members are arranged in the fourth modified example of the second robot. The cover member 27 of the fourth modified example of the robot 1 includes a drainage member 35. The drainage member 35 is arranged at the bottom part of the main body of the cover member 27. The drainage member 35 is formed to be plate-shaped along the shape of the recessed part 25. A cutout part 35a in which a part is cut is formed in the drainage member 35. The cutout part 35a forms an opening part when the cover member 27 is secured to the frame 21. This configuration can also discharge a liquid foreign substance which is accumulated in the recessed part 25 through the opening part.

The opening part formed in the cover member serving as a drain hole, is not limited to the aforementioned third modified example and fourth modified example but any configuration can be adopted where an opening part is formed when securing the cover member to the frame. Further, the opening part can be formed in any position on the cover member.

Figure 12:
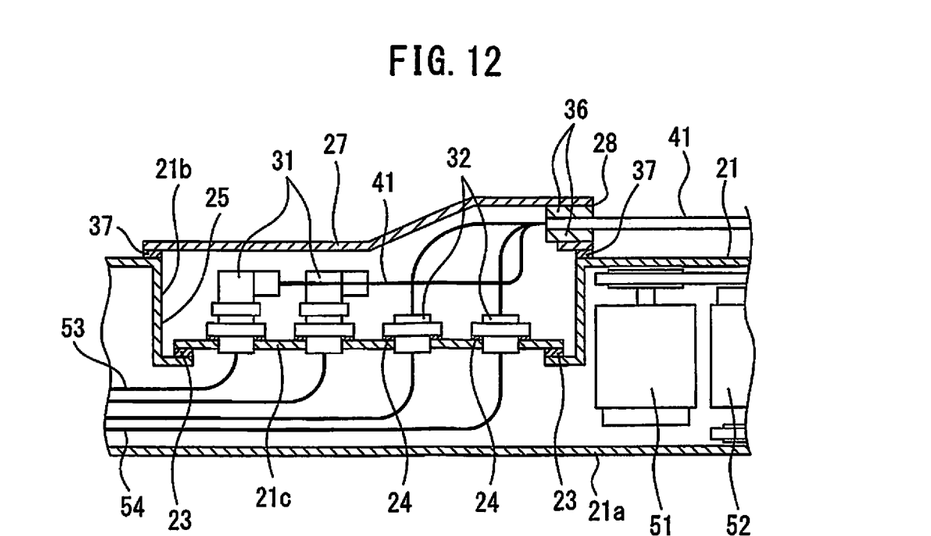
FIG. 12 is a schematic sectional view of a portion at which the connection members are arranged in the third robot according to an embodiment.
Figure 13:
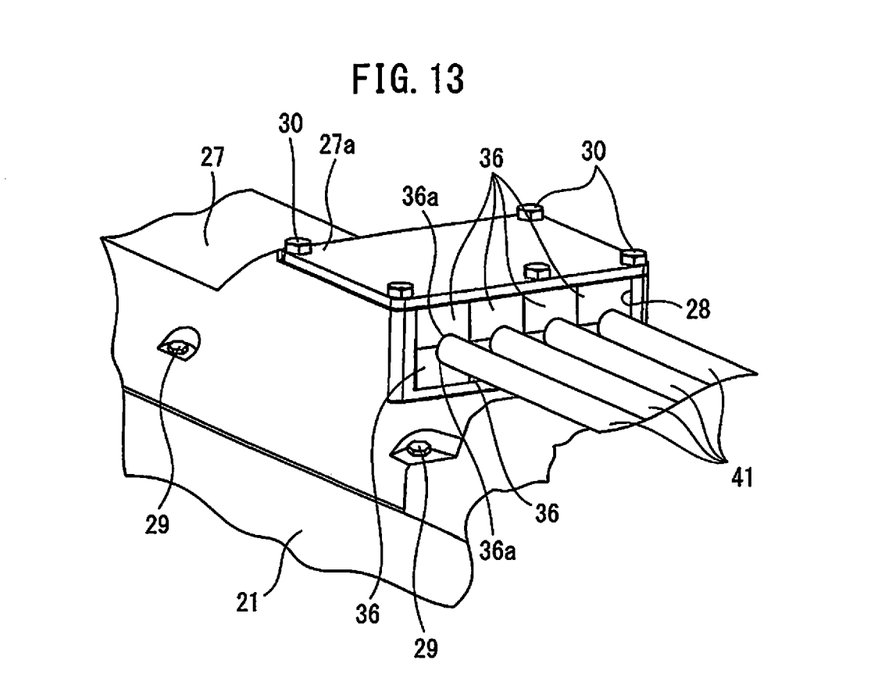
FIG. 13 is an enlarged perspective view of a portion at which the cover member is arranged in the third robot.

FIG. 12 shows a schematic sectional view of a portion at which the connection members are arranged in the third robot according to the present embodiment. FIG. 13 is an enlarged perspective view of a portion at which the hole in the cover member is arranged in the third robot. With reference to FIGS. 12 and 13, the third robot is configured so that the space in which the tube couplings 31 and the connectors 32 are arranged is sealed.

Figure 14:
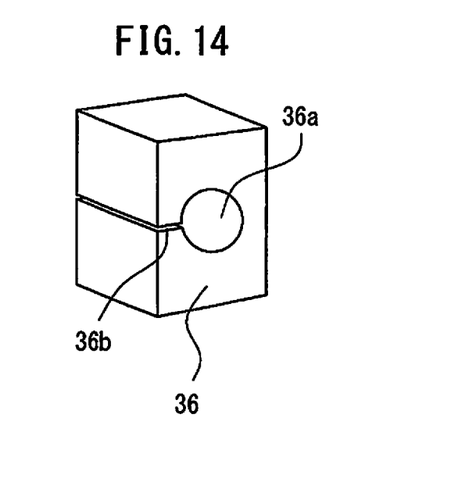
FIG. 14 is a perspective view of a sealing member of the third robot.

Packings 36 serving as a third sealing member are arranged in the hole 28 of the cover member 27. FIG. 14 shows a perspective view of a sealing member of the third robot of the present embodiment. With reference to FIGS. 12 to 14, the third robot uses one packing for one wire body 41. The packing 36 is formed of an elastic material such as rubber. The packing 36 has a through hole 36a and a notch part 36b corresponding to an outer shape of wire body 41. The packing 36 is formed so that the wire body 41 is held in the interior of the through-hole 36a. The interior surface of the through-hole 36a is brought into close contact with the wire body 41.

The packing 36 can make the gap between the holes 28 and the wire bodies 41 airtight. When assembling the cover member 27, the wire bodies 41 are passed though the notch part 36b and arranged inside the through-holes 36a. A packing 36 is attached to each of the plurality of wire bodies 41. Next, the packings 36 having the wire bodies 41 arranged therein are arranged in the hole 28 of the cover member 27. Thereafter, the top plate 27a is secured by bolts 30 and the hole 28 can be sealed.

Further, a packing 37 serving as a fourth sealing member is arranged between the cover member 27 and the frame 21. The packing 37 is formed of an elastic material such as rubber. The packing 37 is formed in a plate shape so as to surround the recessed part 25. By securing the cover member 27 with bolts 29, the packing 37 is brought into close contact with the cover member 27 and the frame 21.

By arranging the packings 36 and the packings 37 as such, the space surrounded by the recessed part 25 and the cover member 27 is sealed. By adopting this configuration, the intrusion of foreign substances such as dust and liquid into the interior of the recessed part 25 where the tube couplings 31 and the connectors 32 are arranged, can be suppressed. The cleanliness of the surroundings of the connection members can be kept high.

Figure 15:
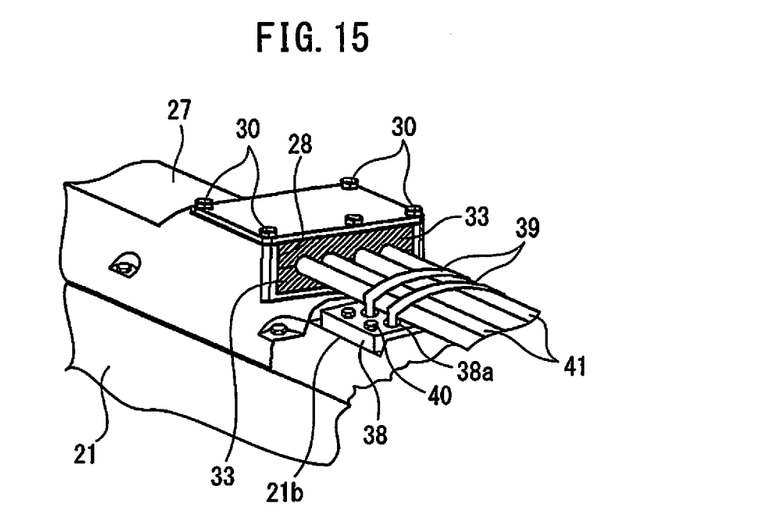
FIG. 15 is an enlarged perspective view of the cover member and the support base in the fourth robot according to an embodiment.

FIG. 15 shows an enlarged perspective view of a part at which the cover member is arranged in the fourth robot according to the present embodiment. In the fourth robot, the arm 11 includes a support base 38 which supports wire bodies 41 and fixing bands 39 serving as fixing members which secure the wire bodies to the support base 38. The support base 38 is secured to the frame 21 by bolts 40 serving as fastening members. The support base 38 is secured in a region in the vicinity of the hole 28, outside the hole 28. The support base 38 is arranged proximate to the hole 28.

Insertion holes 38a through which the fixing bands 39 are inserted are formed in the support base 38. The plurality of wire bodies 41 which come out of the cover member 27 are secured to the support base 38 by the fixing bands 39.

In this way, in the fourth robot, the wire bodies 41 are secured to the frame 21 via the support base 38. By adopting this configuration, the direction in which the wire bodies 41 extend from the hole 28 serving as the extraction port of the wire bodies 41 can be restricted. The wire bodies 41 can be prevented from extending in an unintended direction. For example, the extension of the wire bodies in a direction away from the frame 21 so that the wire bodies protrude from the arm 11 can be suppressed. As a result, the interference of the wire bodies 41 with other device can be suppressed. Further, the wire bodies 41 can be made to extend toward the hand 2, and thus the connection of the wire bodies 41 can be facilitated.

In the example illustrated in FIG. 15, the support base is attached to the frame of the first modified example of the second robot illustrated in FIG. 8.

However, not being limited to this embodiment, the support base may be attached to the other robots. For example, the support base and the fixing members may be attached to the first robot illustrated in FIGS. 1 to 3. The wire bodies are liable to protrude outwards since the first robot does not comprise the cover member. However, by attaching the support base and the fixing members, the protruding of the wire bodies 41 can be suppressed.

As the fixing members of the present embodiment, the fixing bands are used. However, not being limited to this embodiment, any member which can secure the wire bodies to the support base may be employed.

Figure 16:
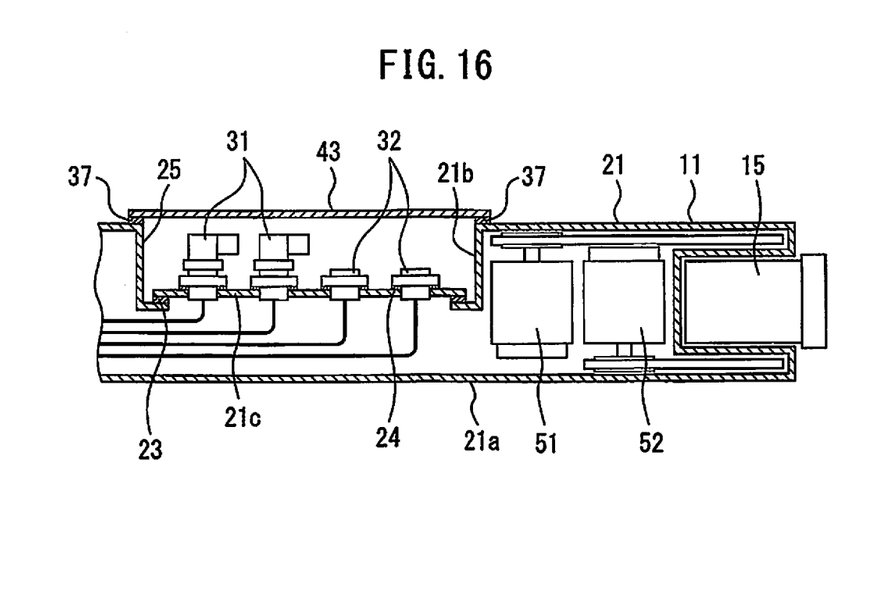
FIG. 16 is a schematic sectional view of a portion at which the connection members are arranged in the fifth robot according to an embodiment.

FIG. 16 shows a schematic sectional view of a portion at which the connection members are arranged in the fifth robot according to the present embodiment. Depending on the type of work tool attached to the robot 1, the supply of air, electricity and etc. may not be necessary. When the supply of air, electricity and etc. is not necessary, the wire bodies are not connected to the connection members. The fifth robot is configured so that a lid member 43 to cover the whole of the recessed part 25 can be attached when wire bodies are not connected to the connection members. The lid member 43 is formed to be plate shaped. The lid member 43 is secured to the frame 21 by fastening members such as bolts. By attaching the lid member 43, the intrusion of foreign substances into the interior of the recessed part 25 can be suppressed. As a result, the cleanliness of the surroundings of the connection members can be increased.

Furthermore, in the present embodiment, a packing 37 serving as a sealing member formed of rubber and etc. is arranged between the lid member 43 and the frame 21. By adopting this configuration, the space surrounded by the recessed part 25 and the lid member 43 can be sealed. Accordingly, the intrusion of foreign substances into the interior of the recessed part 25 can be effectively suppressed.

Figure 17:
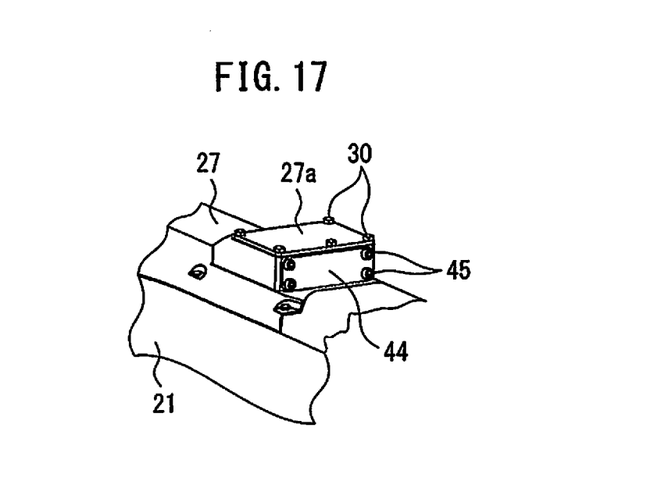
FIG. 17 is an enlarged perspective view of the cover member according to a modified example of the fifth robot.

FIG. 17 shows an enlarged perspective view of a cover member in a modified example of the fifth robot. In modified example of the fifth robot, a cover member 27 is secured to the frame 21. Further, in modified example of the fifth robot, the cover member 27 is used as a lid member. The cover member 27 is formed so that a closing member 44 can be attached to the hole 28 through which the wire bodies 41 are inserted. The closing member is formed to be plate-shaped. The closing member 44 is secured to the main body of the cover member 27 by bolts 45. By attaching the closing member 44, the cover member 27 functions as a lid member which covers the entire recessed part. This modified example also suppresses the intrusion of foreign substances into the interior of the recessed part 25.

In the present embodiment, a robot with connection members arranged in the arm connected to a wrist has been exemplified. However, not being limited to this embodiment, the connection members may be arranged on any arm. Further, in the present embodiment, the wire bodies connected to the connection members are connected to the work tool (end effector). However, not being limited to this embodiment, the wire bodies may be connected to components other than the work tool.

In the present embodiment, an articulated robot with six turning axes has been exemplified and described. However, not being limited to this embodiment, the present invention may be applied to any robot.

According to the present invention, an articulated robot which can suppress interference and accumulation of foreign substances surrounding the connection members can be provided.

The above embodiments can be appropriately combined. In each of the aforementioned drawings, the same or corresponding portions are assigned the same reference notations. Note that the abovementioned embodiments are exemplifications and do not limit the invention. Further, the embodiments include modifications of the embodiments indicated in the claims.

The invention claimed is:

1. An articulated robot comprising:
   an arm which changes a direction at a joint; and
   a connection member to which a wire body is connected and which is attached to the arm; wherein
      the arm includes a frame having a hollow interior,
      the frame includes a tubular part which has a tubular shape, a wall part extending toward the hollow interior of the frame from the tubular part, and a bottom plate part extending along a surface of the arm from the wall part, and
      has a recessed part depressed toward the interior thereof,
      the recessed part is formed of the wall part and the bottom plate part, and
      the connection member is arranged inside the recessed part and,
   a cover member which covers the entire recessed part in a direction perpendicular to the bottom plate part, and the cover member has a hole through which the wire bodies are able to extend externally.

2. The articulated robot according to claim 1, wherein the bottom plate part is constituted by a plate member, the plate member is secured to the wall part via a first sealing member, and the connection member is secured to the plate member via a second sealing member.

3. The articulated robot according to claim 1, wherein the arm includes a dust-proofing member which seal a gap between the hole and the wire body, and the cover member has an opening part to discharge liquid which is flowed into the interior of the recessed part.

4. The articulated robot according to claim 1, wherein the arm includes a third sealing member which seals a gap between the hole and the wire body and a fourth sealing members which seals a gap between the cover member and the frame, and a space surrounded by the recessed part and the cover member is sealed.

5. The articulated robot according to claim 1, wherein the arm includes a support base for supporting the wire bodies and a fixing member for securing the wire bodies to the support base, the support base is secured to the frame in a region in the vicinity of the hole, and the wire body is secured to the support base by the fixing member.

6. The articulated robot according to claim 1, wherein the arm is formed so that a lid member which covers the entire recessed part can be attached when the wire body is not connected to the connection member.

7. The articulated robot according to claim 1, wherein the cover member is detachable from the arm.

* * * * *